Dec. 18, 1928.　　　　　　　　　　　　　　　1,695,929
D. W. PERIN
REMOVABLE CONTAINER FOR VEHICLES
Filed Sept. 25, 1924　　　　4 Sheets-Sheet 1
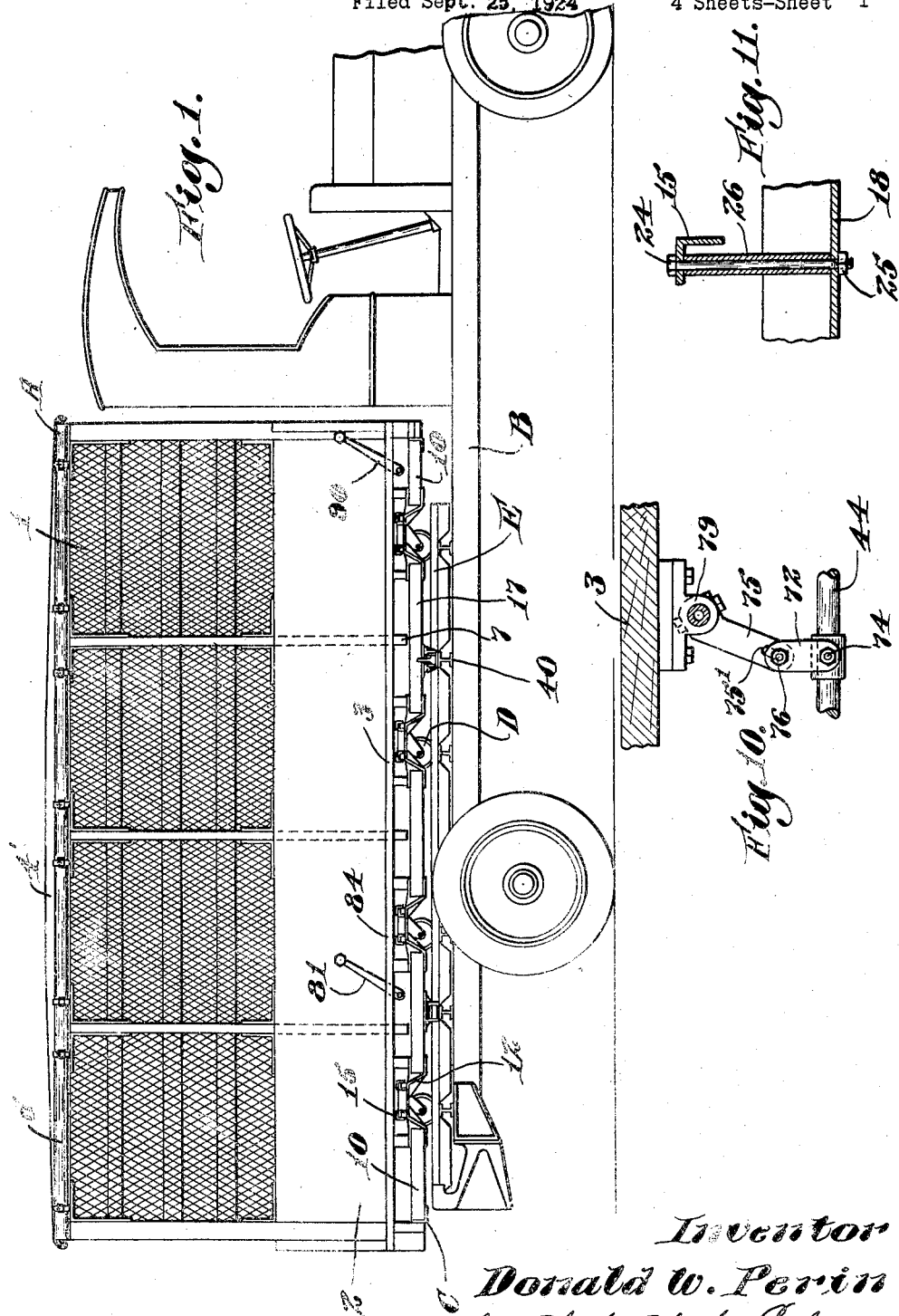
Inventor
Donald W. Perin
Attorneys Dec. 18, 1928. 1,695,929
D. W. PERIN
REMOVABLE CONTAINER FOR VEHICLES
Filed Sept. 25, 1924 4 Sheets-Sheet 2
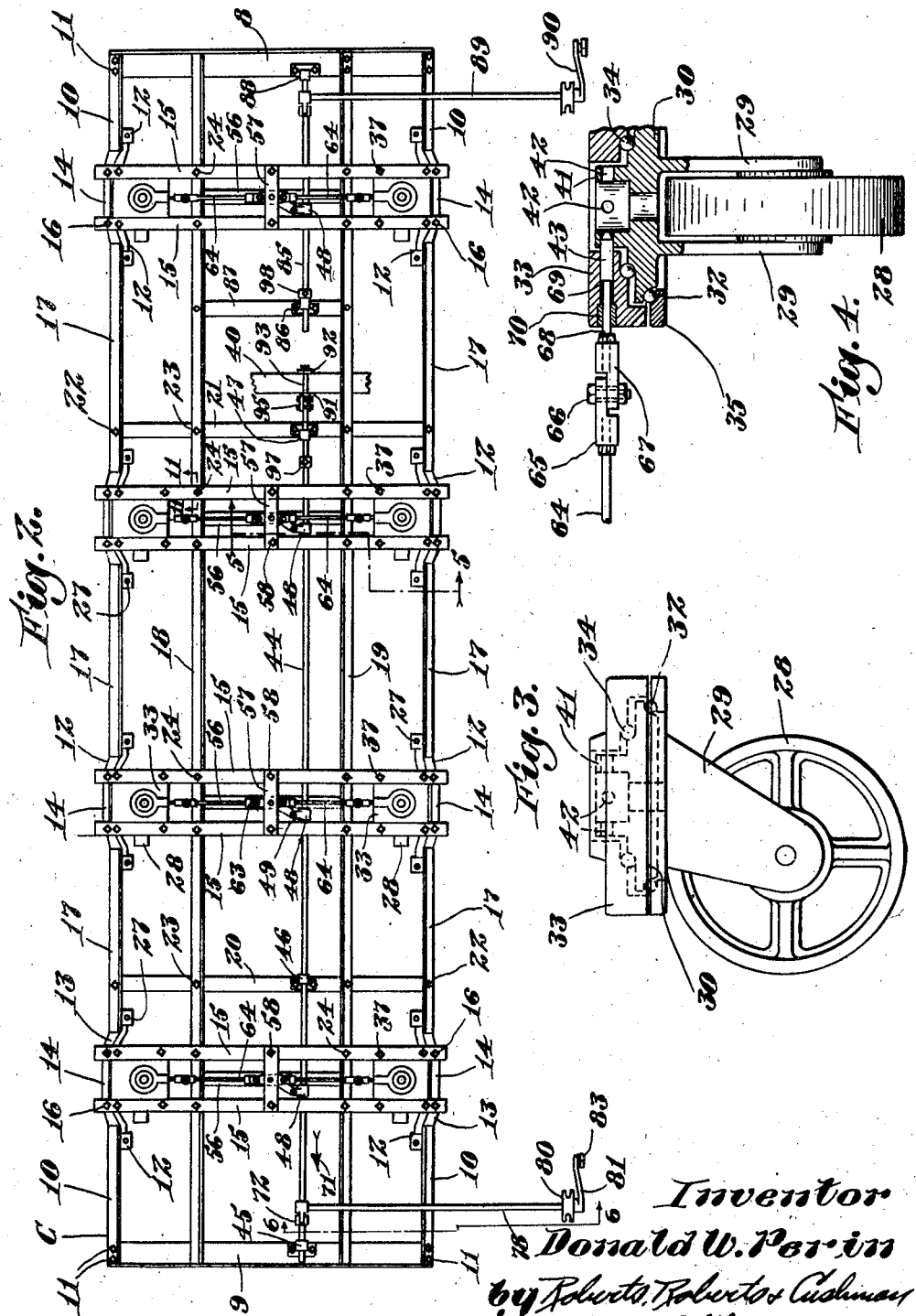
Inventor
Donald W. Perin
by Roberts, Roberts & Cushman
Attorneys

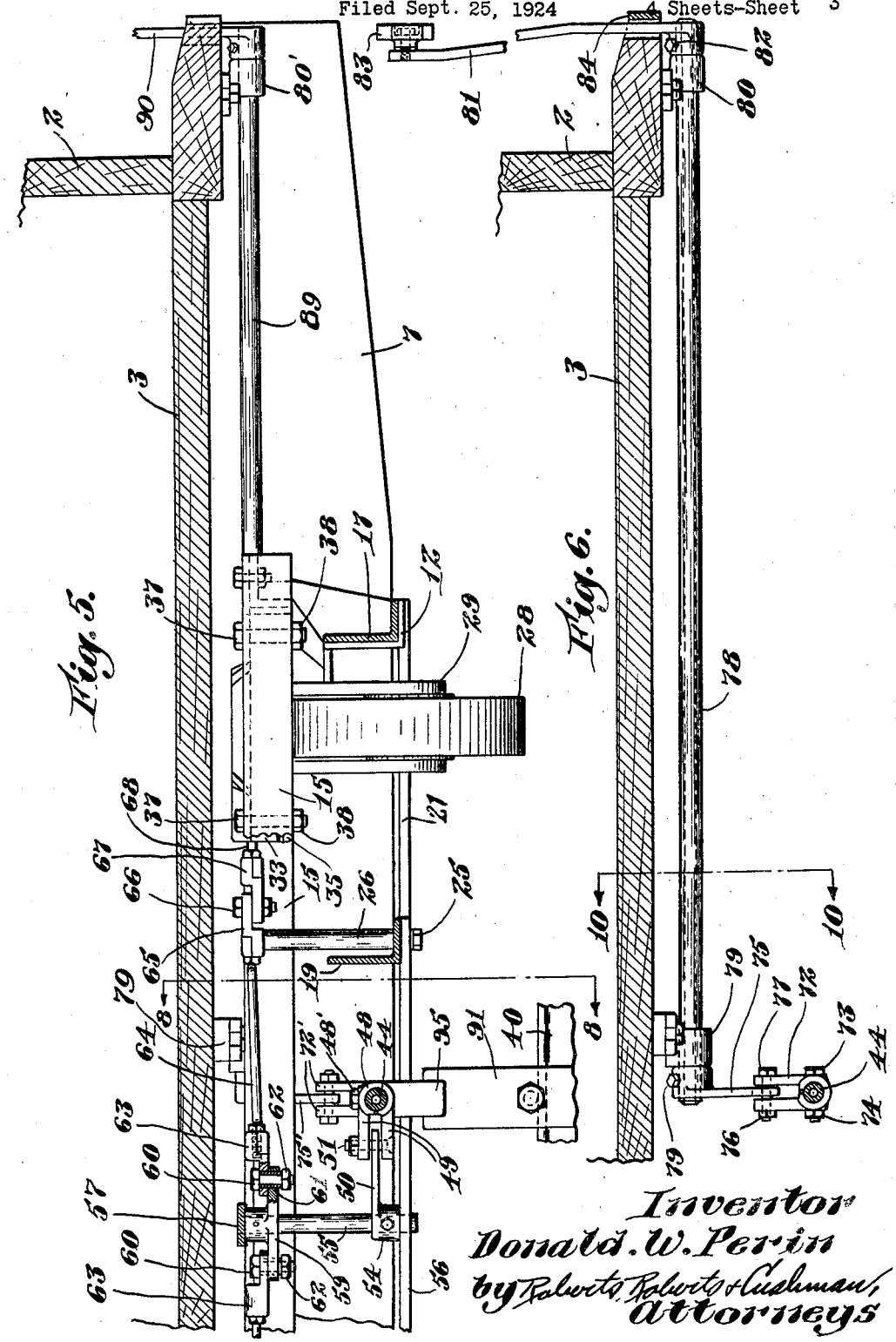

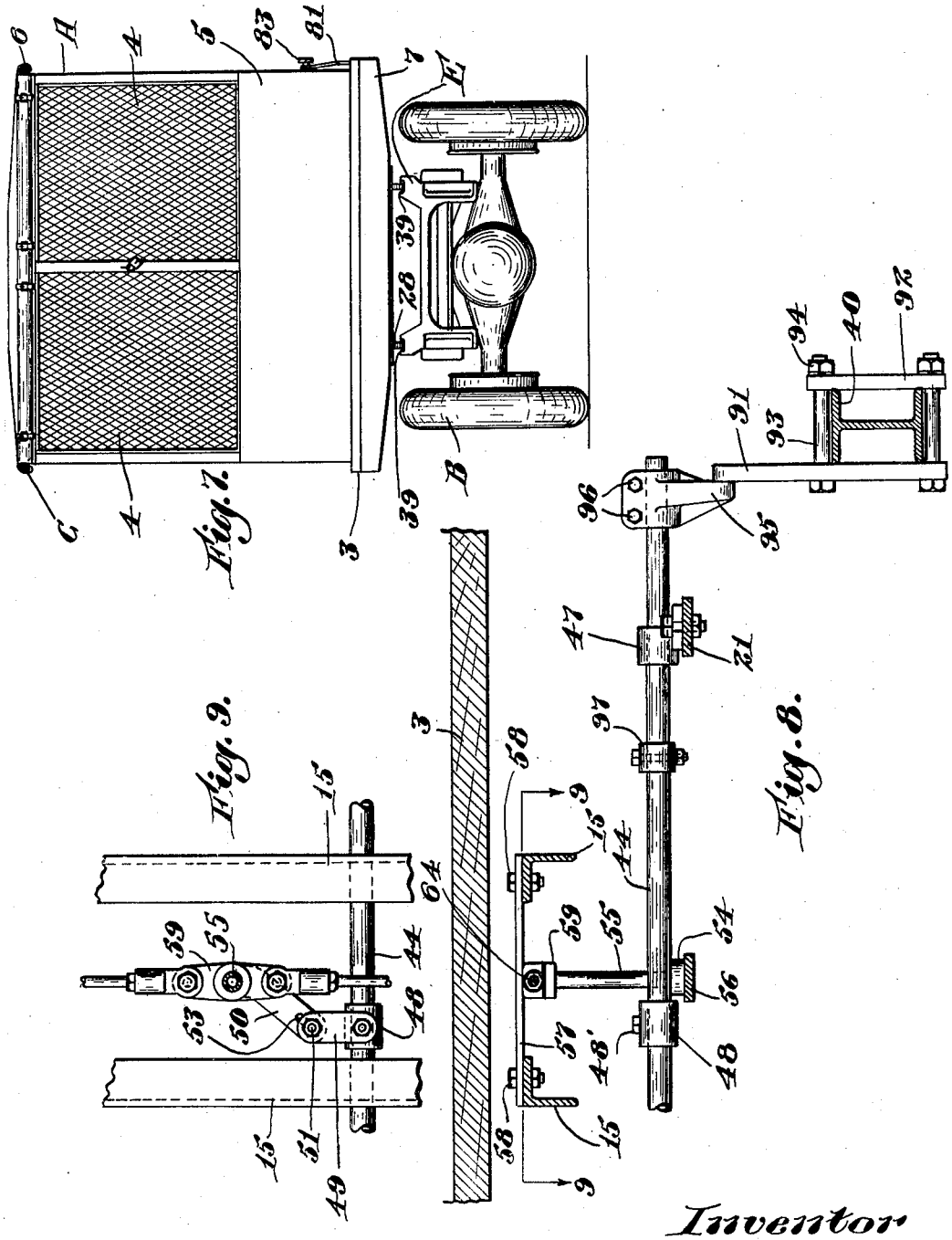

Patented Dec. 18, 1928.

1,695,929

UNITED STATES PATENT OFFICE.

DONALD W. PERIN, OF BROOKLINE, MASSACHUSETTS, ASSIGNOR TO PERIN-WALSH COMPANY, OF BOSTON, MASSACHUSETTS, A CORPORATION OF MASSACHUSETTS.

REMOVABLE CONTAINER FOR VEHICLES.

Application filed September 25, 1924. Serial No. 739,804.

This invention relates to containers which are movable into and out of vehicles such as automobile trucks, freight cars and ships, and which are first loaded and thereafter moved on the vehicle for delivery to their destination.

These containers have been heretofore attached to carriages mounted on swivel casters to facilitate movement from one place to another. In moving such containers into a vehicle the casters swivel to the rear and when the containers are rolled out of the vehicle the casters tend to swivel through 180° to reverse position. If the casters start to swivel to reverse position in opposite directions they cannot roll freely but must slide until all are reversed. When the containers carry a heavy load this makes it difficult to move the container off the vehicle and often results in broken casters. If the casters swivel to reverse position in the same direction the container is moved sidewise and in restricted places this jams the container against the adjacent surface, such as the side of a box-car, truck, etc., when the vehicle is provided with tracks the casters cannot reverse and therefore bind on the tracks as they tend to reverse.

Objects of this invention are to overcome the above difficulties and provide means for controlling the swiveling movement of the rollers to enable the containers to be readily moved in the direction desired; and to enable one or more sets of rollers to be conveniently locked in a desired position, or permit one set of rollers to be locked, and the remaining rollers unlocked to swivel in any direction.

One preferred embodiment of the invention is illustrated in the accompanying drawings in which,—

Fig. 1 is a side elevation of a container mounted on an automobile truck;

Fig. 2 is a top plan view of the carriage for the container;

Fig. 3 is a side elevation of one of the casters;

Fig. 4 is an elevational view partly in vertical section of the roller shown in Fig. 3 turned at right angles;

Fig. 5 is an enlarged view taken on the line 5—5 of Fig. 2;

Fig. 6 is an enlarged view taken on the line 6—6 of Fig. 2;

Fig. 7 is a rear end elevation of the automobile truck shown in Fig. 1;

Fig. 8 is an enlarged view taken on the line 8—8 of Fig. 5;

Fig. 9 is a top view of a part of the actuating means for the locking plungers;

Fig. 10 is a section taken on the line 10—10 of Fig. 6; and

Fig. 11 is an enlarged vertical section taken on the line 11—11 of Fig. 2.

The embodiment of the invention shown for the purpose of illustration comprises a container A adapted to be removably mounted upon the body B of a delivery vehicle such as an automobile truck. The container A is substantially rectangular in form and comprises panels 1 of netting suitably fastened to the frame of the container and lower solid panels 2 which are connected to the bottom 3 of the container. As shown in Fig. 7 one end of the container may be provided with doors 4 and a tail board 5 which is pivoted to the bottom 3. A top 4' covers the container and curtains 6 may be provided for use in inclement weather. Cross-pieces 7 are secured to the bottom 3 of the container and extend transversely thereof beneath the container.

The container A is mounted upon a carriage C which is rectangular in its form and comprises transverse end angle irons 8 and 9 at the opposite ends of the carriage. Parallel side angle irons 10 are suitably secured at one end to the end angle irons 8 and 9 by bolts 11 and the opposite ends of the side angle irons 10 are suitably connected to castings 12 which are provided with upwardly and outwardly extending portions 13 and a top 14 which is substantially parallel to the side angle iron 10. The top 14 of the castings 12 are connected by a pair of parallel cross braces 15 which are secured to the castings by bolts 16. In this instance there are four pairs of castings 12 of similar construction to the castings above described which are connected together by similar cross braces 15 and longitudinal angle irons 17.

Angle irons 18 and 19 extend longitudinally the entire length of the carriage C and are connected at their opposite ends to the end angle irons 8 and 9 respectively, and transverse braces 20 and 21 (Fig. 2) are connected to opposed side angle irons 17 by bolts 22 and to the longitudinally extending angle irons 18 and 19 by bolts 23. The cross braces 15 are connected to the longitudinally extending angle irons 18 and 19 by bolts 24 and nuts 25 and are held in spaced relation therefrom by sleeves 26 as most clearly indicated in Fig. 11. The container A may be connected to the carriage C by screw bolts extending through the holes 27 (Fig. 2) in the castings into the cross-pieces 7.

In order that the container may be readily moved from place to place the carriage C is mounted on rollers D which are clearly shown in Figs. 3 and 4, to comprise casters having wheels 28 which are journaled between the forks 29 integral with circular heads 30 from which the forks depend at an angle. The heads so relate between two sets of ball bearings 32 and 34 in bases which are formed in upper and lower parts 33 and 35 held together by bolts 37 which also serve to secure the bases to the pairs of cross-pieces 15 (Figs. 2 and 5).

Truck B is provided with a sub-frame E having grooved tracks 39 for casters 28 whereby the body may be rolled on and off the truck as desired. The sub-frame E comprises I-beams 40, Figs. 5 and 8, which extend transversely of the body of the truck and form a suitable locking support for the tracks 39. Suitable locking means may be provided to lock the container A on the truck B but as this feature forms no part of the present invention, illustration and description thereof is deemed unnecessary.

The heads 30 of the casters are provided with bosses 41 having holes 42 into which plungers 43 movable in the caster base 33 are adapted to extend thereby preventing the casters from swinging about their vertical axes. In order to actuate the plungers 43, a rod 44 extends longitudinally of the carriage C and is supported in a bearing bracket 45 on the end angle iron 9 and in brackets 46 and 47 on the cross braces 20 and 21.

In order to conjointly actuate a pair of plungers a collar 48 is secured to the rod 44 by a screw 48' and is provided with split lugs 49 between which is clamped a link 50 by a bolt 51 (Figs. 5 and 9). The link 50 is provided with an elongate slot 53 to receive bolt 51. The outer end of the link 50 is provided with a downwardly extending boss 4 which is suitably secured to an upright shaft 55. The lower end of the shaft 55 extends through a cross brace 56 which is connected at its opposite ends to the longitudinal angle irons 18 and 19 respectively; and the upper end of the shaft 55 extends into a brace 57 which is connected at its opposite ends to the parallel cross braces 15 by bolts 58.

A lever 59 is secured at its center to the shaft 55 and bolts 60 having nuts 62 extend through holes in the outer ends of the lever 59 upon which bushings 61 are mounted to provide bearings for the couplings 63. Connecting rods 64 are connected to the couplings 63 at one end and to the couplings 65 at the other end. The couplings 65 are pivotally connected to couplings 67 by bolts 66. Plunger rods 68 are connected to the couplings 67 and the locking plungers 43 at the outer ends of the plunger rods 68 are provided with shoulders 69 which are adapted to abut against sleeves 70 in the base member 33 of the caster forming stops to prevent the plungers from being entirely withdrawn from the caster base 33.

By moving the actuating rod 44 in the direction of the arrow 71 (Fig. 2) the links 50 are rocked by the longitudinal movement of the lugs 49 and rotate the shafts 55 and levers 59 in a clockwise direction to move the connecting rods 64 outwardly and thereby force plungers 43 into the holes 42 in the caster head 30 to lock the casters against swiveling movement as shown in Figs. 2, 4 and 9. By providing several holes 42 in the wheels 30 the casters 28 may be locked in different positions according to the direction of movement of the container A that is desired. The three rearward pairs of casters are locked at one time by moving the actuating rod longitudinally of the carriage C, similar actuating mechanism being provided for each of the three pairs of casters and being similarly connected to the actuating rod 44. It will be understood that the plungers are withdrawn from the holes in the casters by moving the rod 44 in the opposite direction to reverse the operation of the levers above described.

In order to move the actuating rod 44 longitudinally to control the swinging movement of the rear pairs of casters a bracket having lugs 72 is secured to the rod 44 adjacent one end thereof by a bolt 73 and nut 74 and an arm 75 is connected to the lugs 72 by a bolt 77 and nut 76. One end of the arm 75 is provided with a slightly elongate slot 75' (Fig. 10) to provide a lost motion connection between the arm 75 and lugs 72 and the opposite end of the arm 75 is fixed to a rod 78 by a screw 79.

The rod 78 extends at substantially right angles to the actuating rod 44 to one side of the container A and is supported in the bearing brackets 79 and 80 which are connected to the bottom 3 of the container. An operating handle 81 is connected to the outer end of the rod 78 by a screw 82 and a knob 83 is fastened to the outer end of the arm 81 to enable the arm to be conveniently grasped for movement. A band 84 preferably surrounds the container A and serves to guide the movement of the handle 81. By moving the operating handle 81 in one direction or the other the actuating rod 44 will be moved longitudinally to lock or unlock the rear pairs of casters 28.

Separate actuating mechanism is provided for controlling the swinging movement of the pair of casters adjacent the forward end of the carriage C. This mechanism is similar to that heretofore described and comprises an actuating rod 85 supported at one end in the bearing bracket 86 which is secured to a cross bar 87 connected to the longitudinal angle irons 18 and 19 and in the bearing bracket 88 on the end angle iron 8. A separate operating rod 89 is supported in the bearing brackets 79' and 80' and has an operating handle 90 for rocking an arm 75' connected to the bracket lugs 72' which are fixed to the actuating rod 85. By moving the actuating rod 85 longitudinally in one direction or the other, the front pair of casters may be locked or unlocked and the actual locking mechanism is constructed and operates in the same manner as the locking mechanism above described.

It is desirable that the casters be automatically locked from swinging about their vertical axes when the container is rolled upon the truck B so that the casters will be maintained in a line to permit the container A to be conveniently rolled from the truck. In this instance a stop plate 91 is secured to an I-beam 40 adjacent the forward end of the truck by a plate 92, bolts 93 and nuts 94 and a cooperating stop plate 95 secured to the actuating rod 44 by screws 96 is adapted to abut against the stop 91 when the container A is rolled upon the truck B. After the stops 91 and 95 have been brought together further movement of the container A forwardly will move the actuating rod 44 longitudinally and thereby actuate the plungers 43 to lock the rear casters against swinging movement.

A stop 97 is suitably secured to the rod 44 and is adapted to abut against the bearing bracket 47 to limit the longitudinal movement of the rod 44 in one direction to prevent the rod from moving to such a point as to prevent the levers from efficiently operating. A similar stop 98 is secured to the actuating rod 85 and serves a similar purpose to the stop 97.

Although three pairs of rollers have been described having common mechanism for controlling their swinging movement, it will be understood that this number is merely given by way of example and the number may be varied as desired without departing from the spirit of the invention. The casters adjacent the forward end of the container are adapted to be locked independently of the rear casters and this permits the rear casters to swivel while the forward casters remain fixed; thus by pulling the container backwards it may be more readily steered like a vehicle having steering front wheels and non-steering rear wheels. The entire set of casters may be locked when it is desired to move the container along a straight line by moving both operating handles 81 and 90 to actuate the plungers to positively lock the casters.

When the container is rolled on a truck or into a freight car the casters are swivelled to the rear; consequently when the container is rolled off the casters tend to swivel through 180° to a reverse position. When the casters are disposed in tracks this tendency would result in the casters binding on the track. If the casters are not in tracks and the space is limited, as in a freight car, this tendency would throw the container against the side of the car and cause binding. By locking the casters after the container is rolled on a truck or car this tendency is eliminated.

I claim:

1. A container having swivel rollers, means for locking said rollers against swiveling movement, and an actuator projecting from said means to engage a fixed stop when the container is rolled on a vehicle thereby automatically to lock the rollers.

2. A container having swivel rollers, manually operable means on said container for locking said rollers against swiveling movement, and automatic means for locking said rollers when the container is moved into a given relation to a fixed stop.

3. A container having swivel rollers, plungers for positively locking said rollers against swiveling movement and automatically actuable means for operating said plungers to lock said rollers when an element of said means is moved into abutting relation with a fixed stop on a vehicle or the like.

4. A container having swivel rollers, plungers for positively locking said rollers against swiveling movement, means common to several of said plungers to lock said rollers, said means including a longitudinally movable rod and means for automatically actuating said rod to lock said rollers when a part of said means is moved into abutting relation with a fixed stop.

5. A container having swivel rollers, plungers for positively locking said rollers against swinging movement, a rod extending longitudinally beneath said container and connected conjointly to actuate several of said plungers, a stop on said rod adapted to be brought into abutting relation with a fixed stop whereby the rod may be actuated when the container is moved in proper relation to the fixed stop thereby moving several of said plungers to lock the corresponding swivel rollers against swinging movement.

6. A container having swivel rollers, swivel mountings for said rollers providing recesses, plungers adapted to extend into said recesses for locking the rollers against swiveling movement, mechanism for actuating said plungers conjointly to lock said rollers, said mechanism comprising a longitudinally movable rod disposed beneath the container.

Signed by me at Boston, Mass., this 15th day of September, 1924.

DONALD W. PERIN.